(12) United States Patent
Bean et al.

(10) Patent No.: US 10,041,447 B2
(45) Date of Patent: Aug. 7, 2018

(54) PUMP MANIFOLD

(71) Applicant: Caterpillar Inc., Peoria, IL (US)

(72) Inventors: Sunil Jefferey Bean, Peoria, IL (US);
Joshua Wayne Steffen, El Paso, IL (US); Dana Ray Coldren, Secor, IL (US); Cory Andrew Brown, Peoria, IL (US); Robert Michael Campion, Chillicothe, IL (US)

(73) Assignee: Caterpillar Inc., Deerfield, IL (US)

( * ) Notice: Subject to any disclaimer, the term of this patent is extended or adjusted under 35 U.S.C. 154(b) by 714 days.

(21) Appl. No.: 14/610,566

(22) Filed: Jan. 30, 2015

(65) Prior Publication Data

US 2016/0222933 A1    Aug. 4, 2016

(51) Int. Cl.
*F01B 3/10*     (2006.01)
*F04B 53/16*    (2006.01)
(Continued)

(52) U.S. Cl.
CPC ........... *F02M 21/0209* (2013.01); *F01B 3/10* (2013.01); *F02M 21/0206* (2013.01);
(Continued)

(58) Field of Classification Search
CPC .................. F04B 1/0443; F04B 1/0452; F04B 2015/081; F04B 1/143; F04B 1/122;
(Continued)

(56) References Cited

U.S. PATENT DOCUMENTS 2,837,898 A      6/1958  Ahlstrand
3,136,136 A *   6/1964  Gottzmann ............. F04B 15/08
                                                                 417/562
(Continued)

FOREIGN PATENT DOCUMENTS

CA          2 546 315 A1    11/2006
CN          101403381 A      4/2009
(Continued)

OTHER PUBLICATIONS

U.S. Appl. No. 14/597,019, titled "Bearing Arrangement for Cryogenic Pump," filed Jan. 14, 2015, 21 pages.

*Primary Examiner* — Dominick L Plakkoottam
*Assistant Examiner* — Philip Stimpert
(74) *Attorney, Agent, or Firm* — Finnegan, Henderson, Farabow, Garrett & Dunner, LLP (57) ABSTRACT

A manifold for a pump is configured to connect to a jacket to form a reservoir and to connect to at least one pumping mechanism disposed within the reservoir. The manifold includes a first side including a first side surface configured to face the reservoir and a second side including a second side surface. The manifold also includes a bypass passage, at least one push rod guide bore extending through the first side surface and the second side surface, and a leakage passage fluidly connecting the at least one push rod guide bore to an outlet disposed outside the first side surface. The manifold further includes a discharge passage including at least one inlet disposed in the first side surface, and the at least one inlet is configured to receive fluid pumped by the at least one pumping mechanism.

19 Claims, 5 Drawing Sheets

(51) Int. Cl.
  *F02M 21/02*  (2006.01)
  *F04B 1/12*  (2006.01)
  *F04B 1/14*  (2006.01)
  *F04B 23/02*  (2006.01)
  *F02M 43/02*  (2006.01)
  *F04B 53/08*  (2006.01)
(52) U.S. Cl.
  CPC ........ *F02M 21/0218* (2013.01); *F02M 43/02* (2013.01); *F04B 1/122* (2013.01); *F04B 1/143* (2013.01); *F04B 23/02* (2013.01); *F04B 53/08* (2013.01); *F17C 2227/0128* (2013.01); *Y02T 10/32* (2013.01)
(58) Field of Classification Search
  CPC ......... F04B 23/02; F04B 53/16; F02M 23/02; F02M 21/0206; F02M 21/0203; F02M 21/0209; F02M 21/0215; F02M 21/0218; F02M 21/0245; F02M 21/0221; F02M 43/02; Y02T 10/32; F03C 1/0615; F01B 3/08; F01B 3/10; F01B 31/28
  USPC .................................. 417/901; 62/50.6, 50.7
  See application file for complete search history.

(56) References Cited

U.S. PATENT DOCUMENTS

| | | | |
|---|---|---|---|
| 4,239,463 A | 12/1980 | Yaindl | |
| 4,376,377 A | 3/1983 | Duron et al. | |
| 4,393,752 A | 7/1983 | Meier | |
| 4,396,362 A | 8/1983 | Thompson et al. | |
| 4,576,557 A | 3/1986 | Pevzner | |
| 5,085,563 A | 2/1992 | Collins et al. | |
| 5,127,230 A | 7/1992 | Neeser et al. | |
| 5,265,431 A | 11/1993 | Gaudet et al. | |
| 5,509,792 A | 4/1996 | Sullivan et al. | |
| 5,511,955 A | 4/1996 | Brown et al. | |
| 5,522,709 A | 6/1996 | Rhoades | |
| 5,809,363 A | 9/1998 | Tominaga et al. | |
| 5,819,544 A * | 10/1998 | Andonian | F04B 15/08 62/50.2 |
| 5,860,798 A | 1/1999 | Tschopp | |
| 6,006,525 A | 12/1999 | Tyree, Jr. | |
| 6,056,520 A | 5/2000 | Nguyen et al. | |
| 6,149,073 A | 11/2000 | Hickey et al. | |
| 6,481,218 B1 * | 11/2002 | Drelser | B60K 15/03006 62/50.6 |
| 6,663,350 B2 | 12/2003 | Tyree, Jr. | |
| 6,722,366 B2 | 4/2004 | Dresier | |
| 6,898,940 B2 | 5/2005 | Gram et al. | |
| 6,901,911 B2 | 6/2005 | Anderson et al. | |
| 6,916,158 B2 * | 7/2005 | Bishop | F04B 1/0404 417/206 |
| 7,134,851 B2 | 11/2006 | Chenoweth | |
| 8,790,091 B2 | 7/2014 | Mehta et al. | |
| 2002/0148450 A1 * | 10/2002 | Ricco | F02M 37/10 123/514 |
| 2009/0159053 A1 * | 6/2009 | Stockner | F02M 59/44 123/495 |
| 2010/0037967 A1 | 2/2010 | Lu | |
| 2013/0306029 A1 | 11/2013 | Stockner et al. | |
| 2014/0109599 A1 | 4/2014 | Lefevre et al. | |
| 2014/0116396 A1 | 5/2014 | Stockner | |
| 2014/0130522 A1 | 5/2014 | Steffen et al. | |
| 2014/0174106 A1 | 6/2014 | Tang et al. | |
| 2014/0182559 A1 | 7/2014 | Steffen et al. | |
| 2014/0216403 A1 | 8/2014 | Stockner | |

FOREIGN PATENT DOCUMENTS

| | | |
|---|---|---|
| DE | 3515757 A1 | 11/1986 |
| KR | 10-1104171 B1 | 1/2012 |
| KR | 10-2013-0089584 A | 8/2013 |
| WO | WO 99/13229 A1 | 3/1999 |

* cited by examiner

PUMP MANIFOLD

TECHNICAL FIELD

The present disclosure relates generally to a manifold, and more particularly, to a pump manifold.

BACKGROUND

Gaseous fuel powered engines are common in many applications. For example, the engine of a locomotive can be powered by natural gas (or another gaseous fuel) alone or by a mixture of natural gas and diesel fuel. Natural gas may be more abundant and, therefore, less expensive than diesel fuel, In addition, natural gas may burn cleaner in some applications, Natural gas, when used in a mobile application, may be stored in a liquid state onboard the associated machine. This may require the natural gas to be stored at cold temperatures, e.g., about −100 to −162° C. The liquefied natural gas is then drawn from the tank by gravity and/or by a boost pump, and directed to a high-pressure pump. The high-pressure pump further increases a pressure of the fuel and directs the fuel to the machine's engine. In some applications, the liquid fuel may be gasified prior to injection into the engine and/or ignited by diesel fuel (or another fuel or ignition source) before combustion.

One problem, associated with pumps operating at cryogenic temperatures involves heat transfer to the fuel while inside the pump. In particular, moving components of the pump create heat through friction, and this heat (as well as ambient heat and/or heat from lubrication inside the pump) can be conducted to the fuel. If the fuel absorbs too much heat while in the pump, the fuel may gasify too early, thereby disrupting desired operation of the pump and/or the engine.

One attempt to improve pumping of a cryogenic liquid is disclosed in U.S. Pat. No. 2,837,898 (the '898 patent) that issued to Ahlstrand on Jun. 10, 1958. in particular, the '898 patent discloses a swashplate type system having three pumping elements disposed within a container. The container is divided into a liquid chamber and a gas chamber. Connecting rods extend through a neck of the container and the gas chamber to each of the three pumping elements to reciprocatingly drive the pumping elements. A storage tank feeds liquid fuel to a bottom of the liquid chamber. The liquid chamber is connected to the gas chamber via a connecting line, and a gas return line returns vapors and/or liquid fuel from the gas chamber to a top of the storage tank. The level of liquid fuel in the gas chamber is self-adjusting, and remains above the three pumping elements.

While the system of the '898 patent may reduce some heat transfer to the liquid fuel. by positioning the gas chamber above the pumping elements, it may still be less than optimal. In particular, the '898 patent may require a large container to accommodate both of the liquid and gas chambers, which may be difficult to package in some applications and also expensive. Further, the pumping elements themselves may generate heat that is still conducted into the liquid.

The disclosed fluid system is directed to overcoming one or more of the problems set forth above.

SUMMARY

In one aspect, the present disclosure is directed to a manifold for a pump. The manifold is configured to connect to a jacket to form a reservoir and to connect to at least one pumping mechanism disposed within the reservoir. The manifold includes a first side including a first side surface configured to face the reservoir and a second side opposite the first side. The second side includes a second side surface. The manifold further includes at least one push rod guide bore extending through the first side surface and the second side surface, and a leakage passage fluidly connecting the at least one push rod guide bore to an outlet disposed outside the first side surface. The manifold also includes a bypass passage including an inlet disposed in the first side surface, and the bypass passage further includes an outlet disposed outside the first side surface. The manifold further includes a discharge passage including at least one inlet disposed in the first side surface, and the at least one inlet of the discharge passage is configured to fluidly connect to the at least one pumping mechanism to receive fluid pumped by the at least one pumping mechanism. The discharge passage further includes an outlet disposed outside the first side surface.

In another aspect, the present disclosure is directed to a manifold for a pump. The manifold is configured to connect to a jacket to form a reservoir and to connect to at least one pumping mechanism disposed within the reservoir. The manifold includes a first side including a first side surface configured to face the reservoir and a second side opposite the first side. The second side includes a second side surface. The manifold also includes an inlet passage including an inlet disposed outside the first side surface, and the inlet passage further including an outlet disposed in the first side surface. The manifold further includes a plurality of push rod guide bores each extending through the first side surface and the second side surface, and a leakage passage including a plurality of connecting branches fluidly connecting the plurality of push rod guide bores. At least one of the connecting branches is fluidly connected to an outlet branch having an outlet disposed outside the first side surface. The manifold also includes a bypass passage including an inlet disposed in the first side surface, and the bypass passage further includes an outlet disposed outside the first side surface. The manifold includes a discharge passage including a plurality of inlets disposed in the first side surface, and the plurality of inlets of the discharge passage are configured to fluidly connect to the plurality of pumping mechanisms to receive fluid pumped by the plurality of pumping mechanisms. The plurality of inlets are also connected in parallel to an outlet branch, and the outlet branch of the discharge passage has an outlet disposed outside the first side surface.

In another aspect, the present disclosure is directed to a pump including a reservoir configured to receive a fluid from a storage tank, and at least one pumping mechanism configured to receive a first portion of the fluid from the reservoir and discharge pumped fluid through at least one outlet passage. The pump also includes a manifold configured to direct fluid between the reservoir, the storage tank, and the at least one pumping mechanism. The manifold includes a first side surface configured to face the reservoir and connect to the at least one pumping mechanism, and an inlet passage including an inlet configured to receive the fluid from the storage tank. The inlet passage further includes an outlet in the first side surface configured to direct the fluid into the reservoir. The manifold also includes a leakage passage including at least one inlet configured to receive fluid leaked from the at least one pumping mechanism and including an outlet configured to output the fluid leaked from the at least one pumping mechanism. The manifold further includes a bypass passage including an inlet in the first side surface, and the inlet of the bypass passage is configured to receive a second portion of the fluid from the reservoir. The bypass passage further includes an outlet configured to output the second portion of the fluid from the reservoir. The manifold also includes a discharge passage including at least one inlet fluidly connected to the at least one outlet passage of the at least one pumping mechanism, and the discharge passage further includes an outlet configured to output the pumped fluid from the at least one outlet passage.

DETAILED DESCRIPTION

Figure 1:
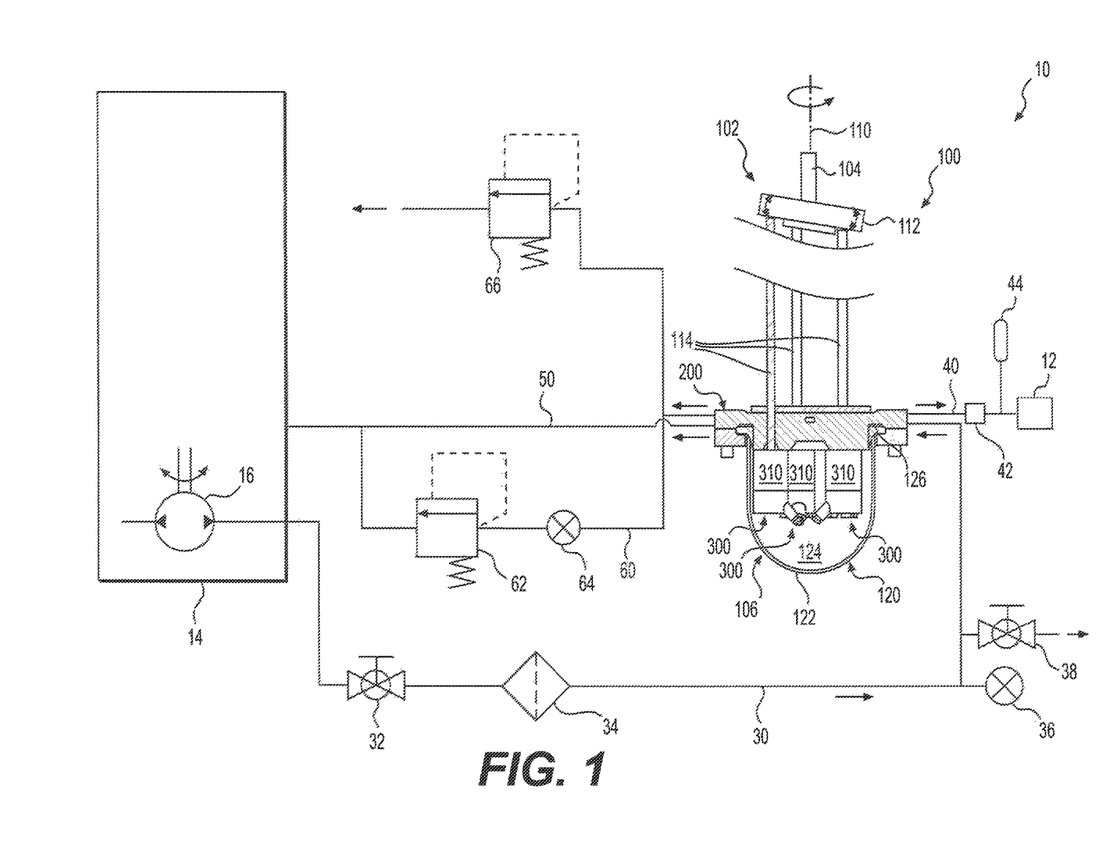
FIG. 1 is a schematic illustration of a fluid system including a pump, according to an exemplary embodiment.

Reference will now be made in detail to exemplary embodiments, which are illustrated in the accompanying drawings, Wherever possible, the same reference numbers will be used throughout the drawings to refer to the same or like parts, FIG. 1 illustrates a fluid system. 10 that may be used to supply a pressurized fluid. In an embodiment, the fluid system 10 may be a fuel system used to provide a pressurized fuel, such as a cryogenic fluid, to a power source, such as an engine 12, which may be a gaseous fuel powered internal combustion engine. It is understood, however, that the disclosed embodiments may apply to other engines that utilize gaseous fuel.

In an embodiment, the fluid system 10 may include a storage tank 14, a boost pump 16, and a pump 100. The storage tank 14 may store fuel as a fluid, e.g., a liquid fuel (LNG) and/or gaseous fuel. The boost pump 16 may pump the fuel, e.g., LNG, from the storage tank 14 to the pump 100 and may generate a low-pressure fluid discharge for supplying to the pump 100. The pump 100 may be mechanically driven by an external source of power (e.g., a combustion engine, such as the engine 12, or an electric motor) to generate a high-pressure fluid discharge for supplying to the engine 12. Thus, the boost pump 16 may be a low-pressure pump, and the pump 100 may be a high-pressure pump. The pump 100 may discharge the fuel, e.g., LNG, intended to be consumed by the engine 12. It is contemplated, however, that the pump 100 may alternatively or additionally be configured to pressurize and discharge a different fluid, such as a different cryogenic fluid, if desired. For example, the cryogenic fluid may be liquefied helium, hydrogen, nitrogen, oxygen, or another fluid known in the art.

An inlet line 30 may fluidly connect the boost pump 16 to the pump 100 to direct fuel, e.g., LNG, pressurized by the boost pump 16 to the pump 100. One or more devices for controlling the flow of fuel may be disposed in the inlet line 30, such as a shut-off valve 32 to stop the flow of fuel to the pump 100. A filter 34 may be disposed in the inlet line 30 to filter the fuel directed to the pump 100. One or more sensors 36 or monitoring devices may be disposed in the inlet line 30 to determine at least one parameter relating to the fuel directed to the pump 100, such as temperature and/or pressure, e.g., to control the fluid system 10. For example, the sensor 36 may monitor the pressure of the fuel to control the boost pump 16 to ensure that the boost pump 16 is pressurizing the fuel to a desired pressure or range of pressures. A vent valve 38 may be disposed in the inlet line 30 to permit the removal of fuel from the inlet line 30, e.g., after shutting down the fluid system 10 and/or the engine 12. The shut-off valve 32 and the vent valve 38 may be manually operated by an operator.

A discharge line 40 may fluidly connect the pump 100 to the engine 12 to direct fuel pressurized by the pump 100 to the engine 12. One or more devices for controlling the flow of fuel to the engine 12 may be disposed in the discharge line 40. In addition, a heater 42 may be disposed in the discharge line 40 to convert the fuel, e.g., LNG, to a gaseous state. An accumulator 44 may be disposed in the discharge line 40 downstream of the heater 42 to store the gaseous fuel, e.g., before starting the engine and/or when priming the pump 100. The accumulator 44 may serve as a reservoir to ensure that fuel of adequate pressure is available to the engine 12. In addition, an injection system (not shown) may deliver the gaseous fuel to the engine 12.

A leakage line 50 and a bypass line 60 may also fluidly connect the pump 100 to the storage tank 14 to direct fuel from the pump 100 to the storage tank 14, as described below. As shown in FIG. 1, the leakage line 50 and the bypass line 60 may combine before connecting to the storage tank 14. A regulating valve 62 may be disposed in the bypass line 60 to control an amount of fuel, e.g., liquid and/or gaseous fuel, directed from the pump 100 to the storage tank 14. In an embodiment, the regulating valve 62 may control the amount of fuel based on a pressure of the fuel in the storage tank 14, e.g., to be within a range of the pressure of the fuel in the storage tank 14, such as within approximately 5 to 1,000 kPa. Alternatively, in place of the regulating valve 62, the bypass line 60 may include an orifice of a fixed size for controlling the amount of fuel directed from the pump 100 to the storage tank 14 via the bypass line 60. One or more sensors 64 or monitoring devices may be disposed in the bypass line 60 to determine at least one parameter relating to the fuel in the bypass line 60, such as temperature and/or pressure, e.g., to control the fluid system 10. For example, the sensor 64 may monitor the temperature of the fuel in the bypass line 60 to control when to start and/or stop priming the pump 100.

A pressure relief valve 66 may be fluidly connected to the bypass line 60 to release pressure to the atmosphere in the event that the pressure of the fuel in the bypass line 60 exceeds a threshold. For example, when a component in the fluid system 10 fails (e.g., if the regulating valve 62 gets stuck in the closed position), then the pressure may increase high enough to break a component in the fluid system 10 and/or cause a failure in the fluid system 10. Also, if the fluid system 10 is shut off when there is liquid fuel present in the bypass line 60 and the liquid fuel is heated, the pressure in the bypass line 60 may increase high enough to break a component in the fluid system 10 and/or cause a failure in the fluid system 10.

The pump 100 may be generally cylindrical and divided into two ends. For example, the pump 100 may be divided into an input or warm end 102, in which a driveshaft 104 is supported, and an output or cold end 106. The cold end 106 may be further divided into a reservoir section 120 and a manifold 200. Each of these sections may be generally aligned with the driveshaft 104 along a common axis 110, and connected end-to-end. With this configuration, a mechanical input may be provided to the pump 100 at the warm end 102 (i.e., via the driveshaft 104), and used to generate a high-pressure fluid discharge at the opposing cold end 106. In most applications, the pump 100 will be mounted and used in the orientation shown in FIG. 1 (i.e., with the reservoir section 120 being located gravitationally lower than the manifold 200).

The warm end 102 may be relatively warmer than the cold end 106. Specifically, the warm end 102 may house multiple moving components that generate heat through friction during operation. In addition, the warm end 102 may be connected to the power source, and therefore may result in heat being conducted from the power source into the pump 100. Further, if the pump 100 and the engine 12 are located in dose proximity to each other, air currents may heat the warm end. 102 via convection. Finally, fluids (e.g., oil) used to lubricate the pump 100 may be warm and thereby transfer heat to the warm end 102. In contrast, the cold end 106 may continuously receive a supply of fluid having an extremely low temperature. For example, LNG may be supplied to the pump 100 from an associated storage tank storing LNG at temperatures of, e.g., about −100 to −162° C. In some embodiments. LNG may be supplied to the pump 100 at less than about −140° C. or less than about −120° C. This continuous supply of cold fluid to the cold end 106 may cause the cold end 106 to be significantly cooler than the warm end 102. If too much heat is transferred to the fluid within the pump 100 from the warm end 102, the fluid may gasify within the cold end 106 prior to discharge from the pump 100, thereby reducing an efficiency of the pump 100.

The pump 100 may be an axial plunger type of pump. In particular, the driveshaft 104 may be rotatably supported within a housing (not shown), and connected at an internal end to a load plate 112. The load plate 112 may be oriented at an oblique angle relative to the axis 110, such that an input rotation of the driveshaft 104 may be converted into a corresponding undulating motion of the load plate 112. A plurality of tappets (not shown) may slide along a lower face of the load plate 112, and a push rod 114 may be associated with each tappet. In this way, the undulating motion of the load plate 112 may be transferred through the tappets to the push rods 114 and used to pressurize the fluid passing through the pump 100. A resilient member (not shown), for example a coil spring, may be associated with each push rod 114 and configured to bias the associated tappet into engagement with the load plate 112. Each push rod 114 may be a single-piece component or, alternatively, comprised of multiple pieces, as desired. Many different shaft/load plate configurations may be possible, and the oblique angle of the driveshaft 104 may be fixed or variable, as desired.

The reservoir section 120 may include a close-ended jacket 122 connected to the manifold 200 (e.g., to a side of the manifold 200 opposite the warm end 102), by way of a gasket 126 and/or pressure-assisted seal, to form an internal enclosure or reservoir 124. The reservoir 124 may be in fluid communication with the inlet line 30 via the manifold 200, as described below. In the disclosed embodiment, the jacket 122 may be insulated, if desired, to inhibit heat from transferring inward to the fluid contained therein.

Figure 2:
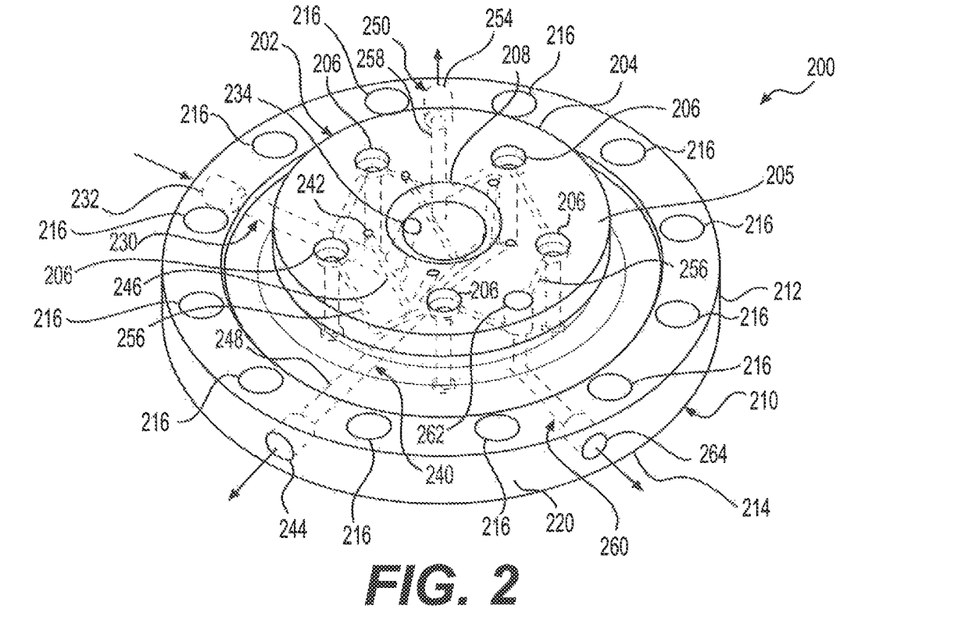
FIG. 2 is a perspective view of a manifold of the pump of FIG. 1.
Figure 3:
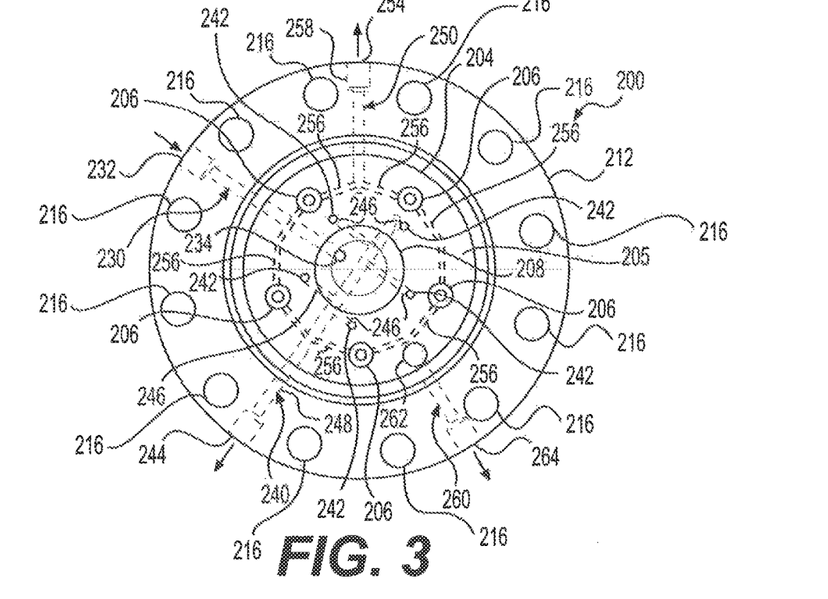
FIG. 3 is a top view of the manifold of the pump of FIG. 1.

The manifold 200 may perform several different functions. In particular, the manifold 200 may function as a guide for the push rods 114, as a mounting pad for one or more pumping mechanisms 300, and as a distributer/collector of fluids for the pumping mechanism(s) 300. In the exemplary embodiment, the pump 100 has five pumping mechanisms 300, but it is understood that there may be more or fewer than five pumping mechanisms 300. The pumping mechanisms 300 may be connected to the manifold 200 and extend into the reservoir 124, FIGS. 2 and 3 illustrate the manifold 200, according to an exemplary embodiment. The manifold 200 may include a first side 202 and a second side 210 opposite the first side 202. A peripheral surface 220 of the manifold 200 may extend between the first side 202 and a second side 210. In the embodiment shown, the manifold 200 has a circular profile when viewed from the top view of FIG. 3, but it is understood that the manifold 200 may have a non-circular profile, such as a square, rectangular, polygonal, or irregular profile.

Figure 4:
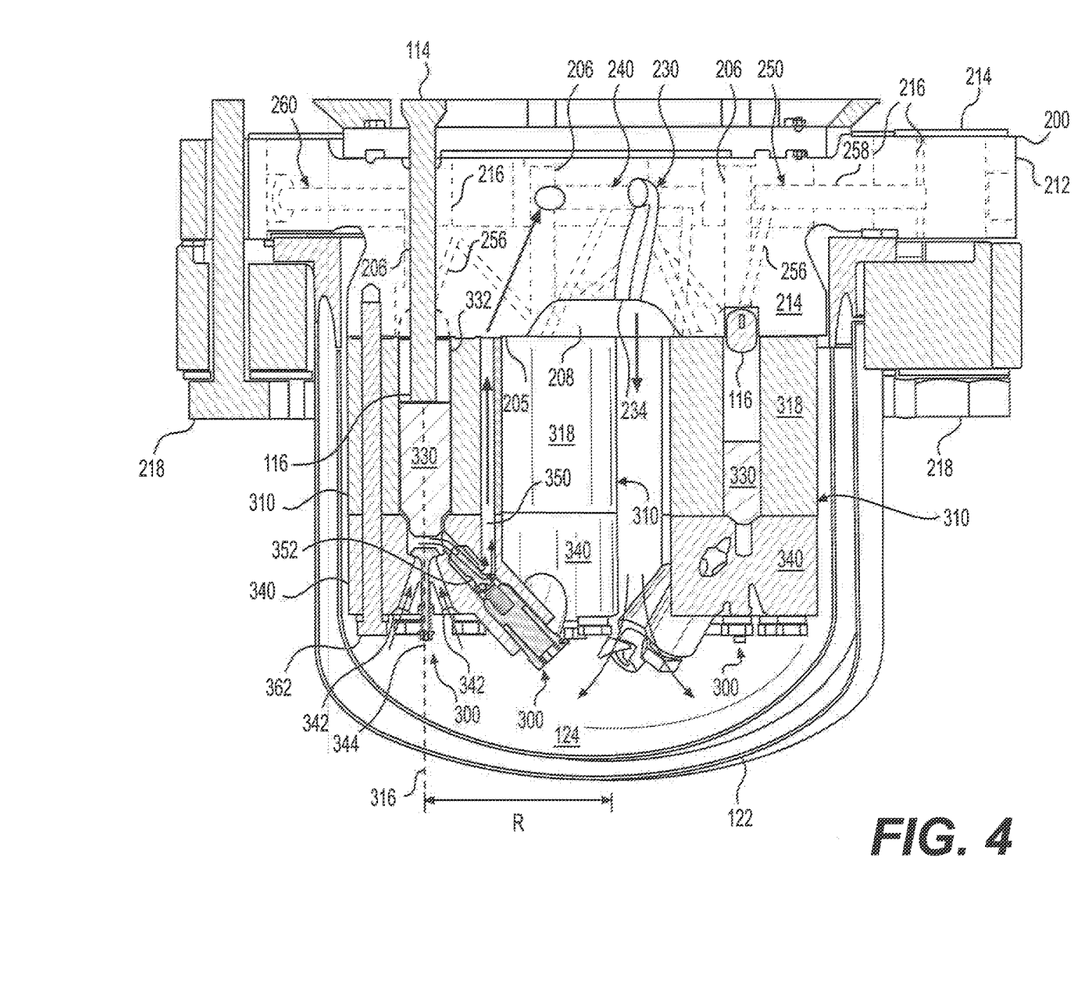
FIG. 4 is a cross-sectional view of the pump of FIG. 1.
Figure 5:
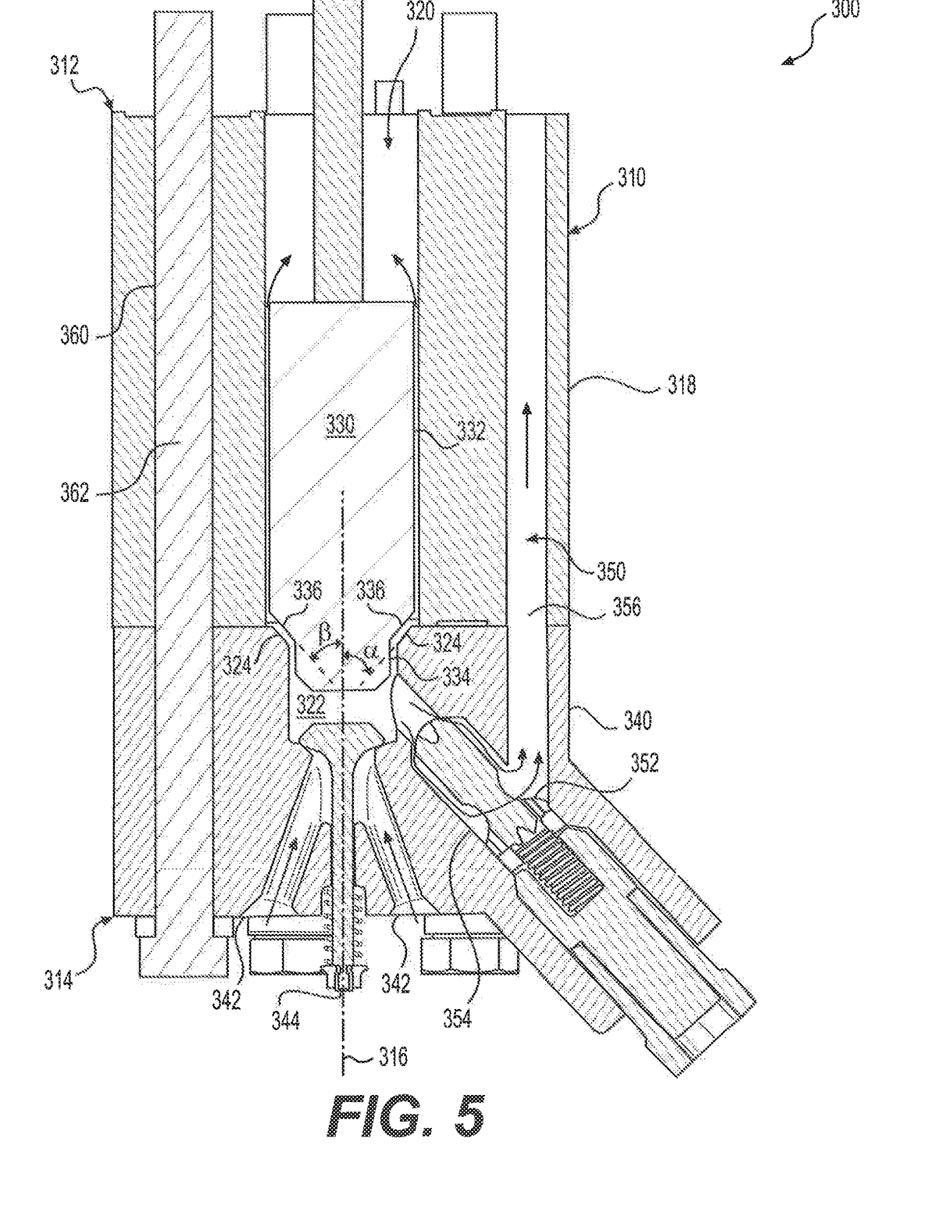
FIG. 5 is a cross-sectional view of a pumping mechanism of the pump of FIG. 1.

The second side 210 may include a base 212 connected to the warm end 102, and the first side 202 may include a raised portion 204 extending from the base 212. The raised portion 204 may be at least partially inserted into the open end of the jacket 122, as shown in FIGS. 1, 4, and 5, to assist in providing a seal between the jacket 122 and the manifold 200.

The raised portion 204 may include a surface 205 that faces the reservoir 124 when the manifold 200 is connected to the reservoir section 120. On the side of the base 212 opposite the raised portion 204, the base 212 may include a surface 214 facing the warm end 102 of the pump 100. Surfaces 205 and 214 may be located on opposite sides of the manifold 200 relative to the axis 110 when disposed in the pump 100.

The base 212 may also form a flan re that extends outward from a periphery of the raised portion 204. One or more mounting bores 216, e.g., twelve mounting bores 216 as shown in FIGS. 2 and 3, may be formed on the flange and may receive one or more fasteners 218. The flange of the base 212 may be connected to a flange of the jacket 122 using fasteners 218, with the gasket 126 sandwiched between the flanges, The manifold 200 may include a plurality of push rod guide bores 206 configured to receive the respective push rods 114. The push rod guide bores 206 may extend through surface 205, and may extend between surfaces 205 and 214 of the manifold 200. As shown in FIG. 3, the push rod guide bores 206 may be disposed radially around the center of surface 205, e.g., radially spaced at generally equal intervals.

The manifold 200 may include a plurality of passages configured to fluidly communicate fuel between the storage tank 14, the pump 100, and the engine 12. In an embodiment, the manifold 200 may have formed therein a common inlet passage 230, a high-pressure discharge passage 240, a leakage passage 250, and a bypass passage 260. It should be noted that the inlet passage 230, the discharge passage 240, the leakage passage 250, and the bypass passage 260 are not shown in any particular orientation in FIGS. 1-3.

Figure 6:
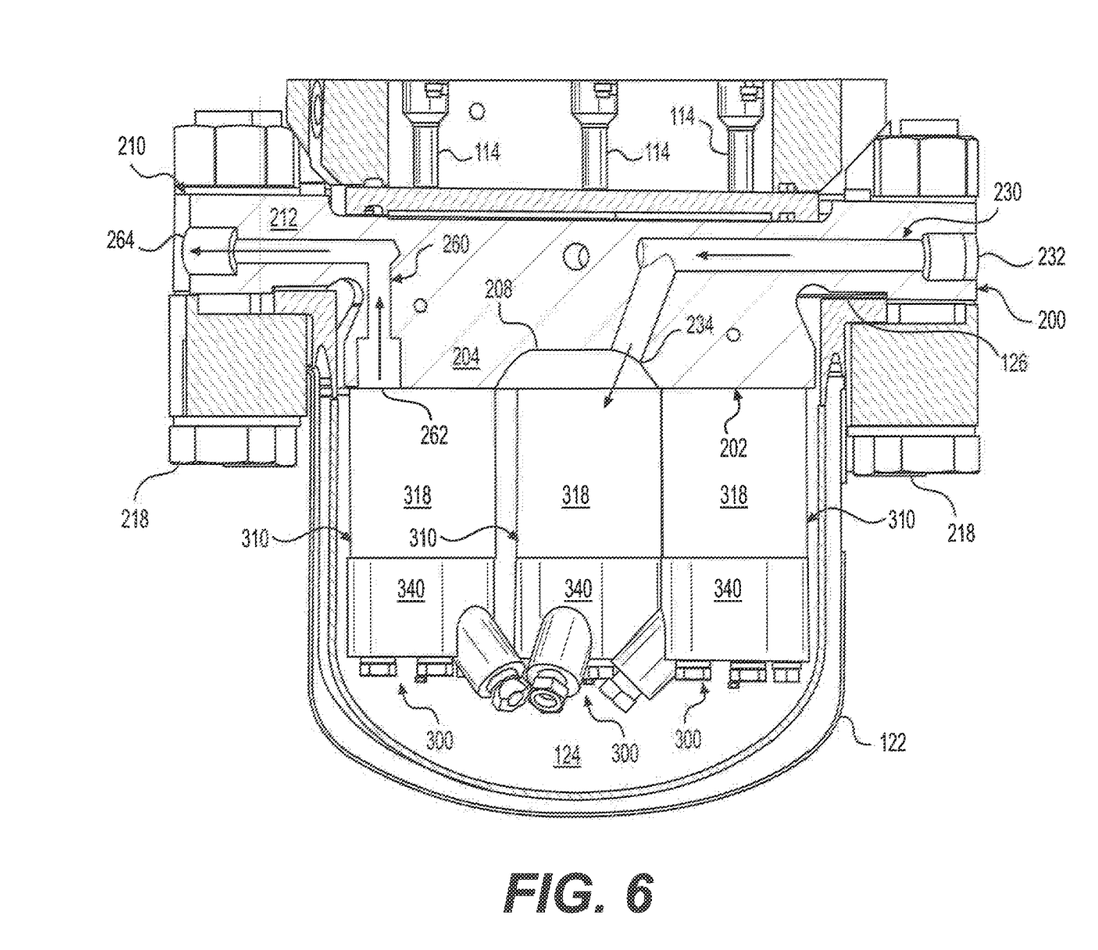
FIG. 6 is another cross-sectional view of the pump of FIG. 1.

The inlet passage 230 may include an inlet 232 that may be fluidly connected to the inlet line 30 so that the inlet 232 may receive fuel pumped from the storage tank 14 using the boost pump 16. The inlet 232 may be disposed on the peripheral surface 220 of the manifold 200, as shown in FIGS. 2, 3, and 6. Alternatively, the inlet 232 may be disposed on any surface of the manifold 200 outside surface 205, such as surface 214. The inlet passage 230 may also include an outlet 234 that may extend through surface 205 so that the fuel pumped from the storage tank 14 may be supplied to the reservoir 124. In an embodiment, surface 205 may include a recess 208 located near or adjacent a center of the surface 205, and the outlet 234 may be disposed in the recess 208. Alternatively, the inlet passage 230 maybe disposed in the jacket 122 rather than the manifold 200, and may fluidly connect to the inlet line 30 to direct fluid from the inlet line 30 to the reservoir 124 contained in the jacket 122.

The inlet passage 230 may be formed by one or more linear bores (e.g., extending along a generally straight line). For example, the inlet passage 230 may be formed by drilling a first linear bore to a desired length into the base 212 starting at the desired location of the inlet 232 and drilling a second linear bore into the raised portion 204 starting at the desired location of the outlet 234 until the second linear bore intersects the first linear bore. The first linear bore that forms the inlet 232 may extend radially toward the center of the base 212 and between a pair of adjacent mounting bores 216. Alternatively, the second linear bore may be drilled to a desired length and then the first linear bore may be drilled until the first linear bore intersects the second linear bore. By drilling the linear bores until they intersect, the inlet passage 230 may be formed without creating extra holes in the outer surface of the manifold 200, which may need to be plugged. As a result, the time and cost to form the manifold 200 may be reduced.

The discharge passage 240 may include one or more inlets 242 that may be fluidly connected to the pumping mechanisms 300 so that the inlet(s) 242 may receive fuel pumped from the pumping mechanisms 300. In the exemplary embodiment, the discharge passage 240 has five inlets 242 corresponding to the number of pumping mechanisms 300, but it is understood that there may be more or fewer than five inlets 242, depending on the number of pumping mechanisms 300 in the pump 100. The inlets 242 may be disposed in surface 205 as described below to receive fuel pumped by the pumping mechanisms 300, which are mounted onto surface 205. The inlets 242 may be disposed farther from the center of surface 205 (and/or the center of the raised portion 204) than the outlet 234 of the inlet passage 230. As shown in FIG. 3, the inlets 242 may also be disposed radially around the recess 208 and/or the center of the surface 205 (and/or the center of the raised portion 204), e.g., radially spaced at generally equal intervals.

The discharge passage 240 may also include a common outlet 244 fluidly connected to discharge the high-pressure fuel received from the inlets 242 out of the pump 100. The outlet 244 may be fluidly connected to the discharge line 40 so that the outlet 244 may direct the pumped fuel to the engine 12. In the embodiment shown in FIGS. 2 and 3, the outlet 244 may be disposed on the peripheral surface 220 of the manifold 200. Alternatively, the outlet 244 may be disposed on any surface of the manifold 200 outside surface 205, such as surface 214.

The discharge passage 240 may also include a plurality of connecting branches 246 that fluidly connect the inlets 242 to a common outlet branch 248 in a tree-shaped configuration. The inlets 242 and the connecting branches 246 may connect in parallel to the outlet branch 248. The outlet branch 248 may combine the flow of fuel from the connecting branches 246 and direct the combined flow to the outlet 244. Each of the connecting branches 246 and the outlet branch 248 may be formed by linear bores. For example, the outlet branch 248 may be formed by drilling a linear bore into the base 212 of the manifold 200 starting at the desired location of the outlet 244 on the peripheral surface 220 until reaching a desired length of the outlet branch 248. The linear bore forming the outlet branch 248 may extend radially toward the center of the base 212 and between a pair of adjacent mounting bores 216. Each of the connecting branches 246 may be formed by drilling a linear bore into the raised portion 204 starting at the desired location of the respective inlet 242 on surface 205 until the linear bore intersects the outlet branch 248. Alternatively, the connecting branches 246 may be drilled to a desired length and then the outlet branch 248 may be drilled until the bore intersects each connecting branch 246. By drilling the linear bores until they intersect, the discharge passage 240 may be formed without creating extra holes in the outer surface of the manifold 200, which may need to be plugged. In addition, the connecting branches 246 may be formed perpendicular to the outlet branch 248 when viewed from the top view of FIG. 3. As a result, the time and cost to form the manifold 200 may be reduced, and the flow path for the high-pressure fuel may be relatively more direct and less complex.

The leakage passage 250 may fluidly connect to the push rod guide bores 206 to receive fuel, e.g., liquid and/or gaseous fuel, leaking from the pumping mechanisms 300 mounted to the manifold 200. The leakage passage 250 may include a common outlet 254 that may be fluidly connected to the leakage line 50 to direct the leaked fuel from the pumping mechanisms 300 back to the storage tank 14. in the embodiment shown in FIGS. 2 and 3, the outlet 254 may be disposed on the peripheral surface 220 of the manifold 200. Alternatively, the outlet 254 may be disposed on any surface of the manifold 200 outside surface 205, such as surface 214.

The leakage passage 250 may include connecting branches 256 that fluidly connect the push rod guide bores 206 in a daisy chain configuration to form a loop. The connecting branches 256 may include inlets that fluidly connect to the respective push rod guide bores 206. The push rod guide bores 206 and the connecting branches 256 may be disposed farther from the center of surface 205 (and/or the center of the raised portion 204) than the outlet 234 of the inlet passage 230 and/or the inlets 242 of the discharge passage 240. As shown in FIG. 3, the push rod guide bores 206 may also be disposed radially around recess 208, the center of surface 205 (and/or the center of the raised portion 204), and/or the inlets 242, e.g., radially spaced at generally equal intervals. in the exemplary embodiment, the leakage passage 250 has five connecting branches 256 corresponding to the five push rod guide bores 206, which corresponds to the number of pumping mechanisms 300, but it is understood that there may be more or fewer than five connecting branches 256, depending on the number of pumping mechanisms 300 in the pump 100.

The leakage passage 250 may also include an outlet branch 258 that fluidly connects to one of the connecting branches 256 forming the loop. The outlet branch 258 may direct the flow of leaked fuel from the loop of connecting branches 256 to the outlet 254. Each of the connecting branches 256 and the outlet branch 258 may be formed by linear bores. For example, each of the connecting branches 256 may be formed by drilling a first linear bore to a desired length into the raised portion 204 starting at one of the push rod guide bores 206 and drilling a second linear bore into the raised portion 204 starting at the adjacent push rod guide bore 206 until the second linear bore intersects the first linear bore. Each push rod guide bore 206, or at least the end thereof, may have a sufficient width to allow the first and second linear bores to be drilled at an angle so that the first and second linear bores intersect to form an apex in the middle of the connecting branch 256. The outlet branch 258 may be formed by drilling a linear bore into the base 212 of the manifold 200 starting at the desired location of the outlet 254 on the peripheral surface 220 until intersecting one of the connecting branches 256. The linear bore forming the outlet branch 258 may extend radially toward the center of the base 212 and between a pair of adjacent mounting bores 216. Alternatively, the outlet branch 258 may be drilled to a desired length and then the connecting branches 256 may be drilled such that one of the connecting branches 256 intersects the outlet branch 258. By drilling the linear bores until they intersect, the leakage passage 250 may be formed without creating extra holes in the outer surface of the manifold 200, which may need to be plugged. As a result, the time and cost to form the manifold 200 may be reduced.

The bypass passage 260 may include an inlet 262 that may extend through surface 205 so that fuel, e.g., liquid fuel, may be directed from the reservoir 124 back to the storage tank 14, as will be described below. The inlet 262 may extend through surface 205 and may be located farther from the center of surface 205 (and/or the center of the raised portion 204) than the outlet 234 of the inlet passage 230, the inlets 242 of the discharge passage 240, the push rod guide bores 206, and/or the connecting branches 256 of the leakage passage 250.

The bypass passage 260 may also include an outlet 264 that may be fluidly connected to the bypass line 60 to direct the fuel from the reservoir 125 to the storage tank 14. The outlet 264 may be disposed on the peripheral surface 220 of the manifold 200, as shown in FIGS. 2, 3, and 5. Alternatively, the outlet 264 may be disposed on any surface of the manifold 200 outside surface 205, such as surface 214.

The bypass passage 260 may be formed by one or more linear bores. For example, the bypass passage 260 may be formed by drilling a first linear bore to a desired length into the base 212 starting at the desired location of the outlet 264 and drilling a second linear bore into the raised portion 204 starting at the desired location of the inlet 262 until the second linear bore intersects the first linear bore. The first linear bore that forms the outlet 264 may extend radially toward the center of the base 212 and between a pair of adjacent mounting bores 216. Alternatively, the second linear bore may be drilled to a desired length and then the first linear bore may be drilled until the first linear bore intersects the second linear bore. By drilling the linear bores until they intersect, the bypass passage 260 may be formed without creating extra holes in the outer surface of the manifold 200, which may need to be plugged. As a result, the time and cost to form the manifold 200 may be reduced.

The linear bores that form the inlet 232 of the inlet passage 230, the outlet 254 of the leakage passage 250, the outlet 264 of the bypass passage 260, and the outlet 244 of the discharge passage 240 may extend between different pairs of the plurality of mounting bores 216.

As shown in FIGS. 4-6, each pumping mechanism 300 may include a barrel assembly 310 including a base or proximal end 312 and a distal end 314 opposite the proximal end 312. The terms "proximal" and "distal" amused herein to refer to the relative positions of the components of the exemplary barrel assembly 310. When used herein, "proximal" refers to a position relatively closer to the end of the barrel assembly 310 that connects to the manifold 200. In contrast, "distal" refers to a position relatively further away from the end of the barrel assembly 310 that connects to the manifold 200.

A majority of the outer surface of the barrel assembly 310 may be generally cylindrical and may have a longitudinal axis 316 extending between the proximal end 312 and the distal end 314. The barrel assembly 310 may include a generally hollow barrel 318 formed at the proximal end 312 and a head 340 formed at the distal end 314. The head 340 may be attached to the barrel 318 to close off the barrel 318. Alternatively, the barrel assembly 310, including the barrel 318 and the head 340, may be formed integrally as a single component.

A plunger bore 320 may extend through the barrel 318 and may be configured to receive a plunger 330 for sliding within the plunger bore 320. A distal end of the plunger bore 320 may form a chamber 322, which may extend into the head 340. A proximal end of the plunger bore 320 may also align with the push rod guide bores 206 in the manifold 200 such that the plungers 330 may slide proximally into at least a portion of the push rod guide bores 206. The plunger bore 320 may extend generally parallel to the axis 316 of the barrel assembly 310. The plunger bore 320 may have an axis that is collinear with the axis 316 of the barrel assembly 310, which may be collinear with an axis of the barrel 318.

The plunger 330 may include a main portion 332, a distal portion 334, and may form a shoulder 336 at the transition between the main portion 332 and the distal portion 334. The shoulder 336 may be angled as shown in FIG. 5, or may form a step, curve, or other shape. The cross-section of the main portion 332 may be sized with respect to the cross-section of the plunger bore 320 such that the main portion 332 may slide within the plunger bore 320 without damaging the plunger bore 320 or the plunger 330. In the embodiment shown in FIG. 5, the chamber 322 at the distal end of the plunger bore 320 may have a lateral dimension (e.g., an inner diameter or width) that is smaller than a lateral dimension of the proximal end of the plunger bore 320 through which the main portion 332 slides. The plunger bore 320 may form a transition portion 324 (FIG. 5) at the transition between the smaller lateral dimension of the chamber 322 and the larger lateral dimension ref the proximal end of the plunger bore 320. As shown in FIG. 5, the transition portion 324 may he formed with a chamfer or angled edge to correspond to the angled shoulder 336 of the plunger 330, or alternatively may form a step, curve, or other shape. In an embodiment, the chamber 322 having the smaller lateral dimension may be disposed in the head 340, and the proximal end of the plunger bore 320 having the larger lateral dimension may be disposed in the barrel 318.

The angled edge of the transition portion 324 of the plunger bore 320 may have an angle α (FIG. 5) that is different from an angle β of the shoulder 336 of the plunger 330. The difference in angles (angle differential) may be approximately 3° to 6°. For example, in an embodiment, the angled edge of the transition portion 324 of the plunger bore 320 may be formed at an angle αof approximately 40° relative to the axis 316 of the barrel assembly 310, and the shoulder 336 of the plunger 330 may be formed at an angle β of approximately 45° relative to the axis of the plunger 330 (which may be collinear with the axis 316 of the barrel assembly 310), thereby resulting in an angle differential (e.g., the difference between angle α and angle β) of approximately 5°. Providing the angle differential may assist in preventing the plunger 330 from wedging into and sticking in the plunger bore 320 if the distal portion 334 of the plunger 330 slides into the chamber 322. Alternatively, the angle αof the angled edge of the transition portion 324 may be substantially equal to the angle β of the shoulder 336.

The cross-section of the distal portion 334 of the plunger 330 may be sized with respect to the cross-section of the chamber 322 such that the distal portion 334 may slide within the chamber 322 without damaging the plunger bore 320 or the plunger 330. The distal portion 334 may have a lateral dimension (e.g., outer diameter or width) that is smaller than a lateral dimension of the main portion 332.

Alternatively, the chamber 322 and the distal portion 334 of the plunger 330 may have the same size and cross-section as the proximal end of the plunger bore 320 and the main portion 332 of the plunger 330, respectively.

The head 340 may include at least one inlet passage 342 fluidly connected to the plunger bore 320 and configured to receive fuel from the reservoir 124. In the exemplary embodiment, the head 340 has four inlet passages 342 disposed radially around the axis 316, e.g., radially spaced at generally equal intervals, but it is understood that there may be more or fewer than four inlet passages 342. Each inlet passage 342 may include an inlet adjacent to the distal end 314 and an outlet connected to the plunger, bore 320 so than the plunger, bore 320 receives fuel from the reservoir 124 via the inlet passages 342. For example, the inlet of each inlet passage 342 may extend through the distal end 314.

The reservoir 124 may receive fuel pressurized by the boost pump 16 via the inlet line 30 and the inlet passage 230 in the manifold 200. The reservoir 124 may be completely or nearly completely filled with liquid fuel during a pumping operation. Accordingly, the outer surface of the barrel assembly 310, e.g., the outer surfaces of the barrel 318 and the head 340, may be at least partially submerged within the liquid fuel during operation. Fuel may surround at least a portion of the outer surface of the barrel assembly 310 at the distal end 314, For example, at least the distal end of the head 340 (e.g., at least the inlets of the inlet passages 342) may be located a distance below a liquid surface inside the reservoir 124. The pump 100 may normally be packaged for use in the orientation shown in FIGS. 1 and 4-6, such that the manifold 200 may cover an opening of the jacket 122 to form the reservoir 124. Therefore, the manifold 200 may form a ceiling of the reservoir 124, and the jacket 122 may constitute a floor and walls thereof.

Each push rod 114 may extend through the push rod guide bores 206 in the manifold 200 into a corresponding barrel 318. For example, each push rod 114 may include a distal end 116 that may contact and push the plunger 330 distally within the plunger bore 320. The push rod 114 may separate and move away from the plunger 330, as will be described below.

The barrel 318 and the head 340 may also form an outlet passage 350 fluidly connected to the plunger bore 320 and configured to receive fuel from the plunger bore 320. The inlet passages 342 and the outlet passage 350 may open into the chamber 322 such that flow into and out of the chamber 322 may be controlled by an inlet check valve 344 and an outlet check valve 352 described below.

During normal operation of the pump 100, the plunger 330 may slide between a Bottom-Dead-Center position (BDC) and a Top-Dead-Center (TDC) position within the plunger bore 320. The head 340 may house valve elements that facilitate fuel pumping during the movement of the plunger 330 between BDC and TDC positions. In an embodiment, the head 340 may include the inlet check valve 344 associated with the inlet flow from the inlet passages 342, and the outlet check valve 352 associated with outlet flow to the outlet passage 350. Thus, the inlet passages 342 are fluidly connected to the plunger bore 20 via the inlet check valve 344.

Due to the undulation of the load plate 112 during normal operation of the pump 100, the push rod 114 may move away and be spaced from the plunger 330 (upward movement in FIGS. 4 and 5). Due to the difference in pressure between the distal and proximal ends of the plunger 330, the plunger may move from TDC to BDC (upward movement in FIGS. 4 and 5). Specifically, pressurized fuel from the boost pump 16 (via the inlet line 30 and the reservoir 124) may unseat an element of the inlet check valve 344, allowing the fuel to be directed into the plunger bore 320. The pressure acting on the distal end of the plunger 330 is generally equal to the boost pressure of the pressurized fuel pumped from the boost pump 16 (via the inlet line 30), and the pressure acting on the proximal end of the plunger 330 is generally equal to the relatively lower tank pressure of the fuel stored in the storage tank 14 (via the leakage line 50). The pressure differential causes the plunger to move from TDC to BDC. Thus, the boost pump 16 provides pressure sufficient to lift the plunger 330.

The undulation of the load plate 112 may also cause the push rod 114 to move toward and push against the proximal end of the plunger 330 (downward movement in FIGS. 4 and 5). During the ensuing plunger movement from BDC to TDC (downward movement in FIGS. 4 and 5), high pressure may be generated within the plunger bore 320 by the volume contracting inside the plunger bore 320. This high pressure may function to reseat the element of the inlet check valve 344 and unseat an element of the outlet check valve 352, allowing fuel from within the plunger bore 320 to be pushed out through the outlet passage 350. Then during the next plunger movement from TDC to BDC, the element of the outlet check valve 352 may be reseated. One or both of the elements of the inlet check valve 344 and the outlet check valve 352 may be spring-biased to a particular position, if desired (e.g., toward their seated and closed positions). The fuel may be discharged from the plunger bore 320 through the outlet passage 350, and the pressurized fuel from the outlet passages 350 of all of the pumping mechanisms 300 may be combined in the discharge passage 240 in the manifold 200 for discharge from the pump 100 via discharge line 40.

During normal operation of the pump 100, the plunger 330 and/or the plunger bore 320 may be configured so that the plunger 330 does not slide far enough within the plunger bore 320 to contact the transition portion 324 when the plunger 330 moves from BDC to TDC. If the plunger 330 does slide far enough to contact the transition portion 324, the transition portion 324 may prevent the plunger 330 from contacting the inlet check valve 344. The shoulder 336 of the plunger 330 may abut against the transition portion 324 to prevent the plunger 330 from sliding too far into the chamber 322.

Further, the length of the distal portion 334 of the plunger 330 along the axis 316 and the length of the chamber 322 along the axis 316 may be configured so that the distal portion 334 and the inlet check valve 344 are far enough away from each other to avoid overlap between the normal ranges of motion of the plunger 330 and the inlet check valve 344. The respective lengths of the distal portion 334 and the chamber 32.2 may also be configured so that the distal portion 334 and the inlet check valve 344 are close enough to each other to minimize the volume in the chamber 322. For each stroke of the plunger 330 during normal operation of the pump 100, the chamber 322 may contain an amount of fuel that is pressurized by the pumping mechanism 300, but is not discharged. through the outlet check valve 352 into the outlet passage 350. The energy used to pump the fuel contained in the chamber 322 may be wasted. Therefore, minimizing the volume of the chamber 322 may minimize the amount of energy wasted by the pump 100. Also, the fuel in the chamber 322. may be warmer and may transfer heat to the fuel in the next stroke. Warmer fuel may be less viscous, which may then result in more fuel leaking into the leakage passage 250 and a reduction in pump efficiency. Warmer fuel may also be less dense, which may also result in a reduction in pump efficiency, Fuel may leak past the plungers 330 into the proximal ends of the respective plunger bores 320 due to the pressure differential between the pressure acting on the distal end of the plunger 330 and the pressure acting on the proximal end of the plunger 330. The proximal ends of the plunger bores 320 may be fluidly connected to the respective push rod guide bores 206, which may direct the leaked fluid to the leakage passage 250 in the manifold 200. The leaked fuel from each of the pumping mechanisms 300 may be combined in the leakage passage 250 and directed back to the storage tank 14 via leakage line 50, as described above.

The outlet passage 350 may be separate from the plunger bore 320 such that the plunger bore 320 and the outlet passage 350 form separate openings in the proximal end 312 of the barrel assembly 310. In an embodiment, the outlet passage 350 may include a first portion 354 and a second portion 356. The outlet check valve 352 may be disposed in the first portion 354, and the second portion 356 may receive fuel from the first portion 354 via the outlet check valve 352. The first portion 354 may extend from the plunger bore 320 toward the distal end 314 of the barrel assembly 310 at an acute angle with respect to axis 316. The second portion 356 may be generally parallel to the plunger bore 320 and may form the opening of the outlet passage 350 adjacent to the proximal end 312 of the barrel 318. For example, the opening of the outlet passage 350 may form the outlet of the outlet passage 350 and may extend through the proximal end 312 of the barrel 318. The second portion 356 may be located closer to the outer surface of the barrel assembly 310 (e.g., the outer surface of the barrel 318 and the head 340) than the plunger bore 320.

The pumping mechanisms 300 may be mounted in a radial configuration on the manifold 200, e.g., radially spaced with respect to axis 110. For example, the barrel assemblies 310 may be spaced at generally equal intervals around axis 110 and at a radial distance R (FIG. 4) with respect to axis 110. To mount each pumping mechanism 300 to the manifold 200, the barrel assembly 310 may include one or more mounting bores 360 configured to receive one or more fasteners 362. In the exemplary embodiment, the barrel assembly 310 has five mounting bores 360 configured to receive five fasteners 362, but it is understood that there may be more or fewer than five mounting bores 360 and fasteners 362. The mounting bores 360 may extend from the proximal end 312 to the distal end 314 of the barrel assembly 310, and may be generally parallel to the plunger bore 320 and the second portion 356 of the outlet passage 350. Each barrel assembly 310 may include a boss or other protrusion in which the outlet check valve 352 is disposed, and which extends from the head 340, as shown in FIGS. 1 and 4-6. The boss may extend generally radially outward from the axis 316 of the barrel assembly 310 and distally from the distal end 314. Also, to reduce the possibility for interference, each barrel assembly 310 may be rotated by about 15° or less so that the bosses may extend at an angle with respect to the line connecting the axes 110 and 316 instead of pointing directly toward axis 110 of the pump 100.

INDUSTRIAL APPLICABILITY

The disclosed fluid system and pump finds potential application in any fluid system where heat transfer to the fluid is undesirable and where priming of the pump is desired. The disclosed pump finds particular applicability in cryogenic applications, for example power system applications having engines that burn LNG fuel. One skilled in the art will recognize, however, that the disclosed pump could be utilized in relation to other fluid systems that may or may not be associated with a power system. Operation of the fluid system 10 and the pump 100 will now be explained.

Priming of the pump 100 may occur when the engine 12 is stopped or operating in a mode that does not depend on high-pressure fuel from the pump 100, such as a diesel-only operating mode or a low-pressure gas spark-ignited operating mode. Priming of the pump 100 may be desired, for example, when the pump 100 is started after being inactive for an extended period of time. Due to the inactivity, the pump 100 may warm to temperatures that are less desirable for operation of the pump 100, e.g., up to ambient temperatures. Therefore, priming of the pump 100 may be desirable to cool the pump 100 to a desirable operating temperature before the pump 100 may be started at normal operation to supply high-pressure fuel to the engine 12. As a result, the likelihood of a pump failure due to thermal gradients in the pump 100 may be reduced. Also, the pump 100 may not operate as efficiently or at all if one or more of the components in the pump 100 are too hot. The heat may cause fuel in the pump 100 to vaporize and prevent the build-up of pressure in the chamber 322.

The pump 100 may be cooled by allowing flow to circulate through the pump 100 using the inlet line 30, the discharge line 40, the leakage line 50, and the bypass line 60. To begin priming the pump 100, the boost pump 16 may be started. Referring to FIG. 1, the boost pump 16 may supply fuel pressurized to a boost pressure from the storage tank 14 into the reservoir 124 via the inlet line 30. During priming, the power source (e.g., the electric motor) for rotating the driveshaft 104 may remain shut down and inactive. As a result, the push rods 114 may also be inactive and held in position so that they do not push the plungers 330, thereby causing the plungers 330 to be inactive.

Fuel pressurized by the boost pump 16 may flow from the reservoir 124 (e.g., through the inlet passages 342 and past the inlet check valves 344 in the barrel assemblies 310) into the barrel assemblies 310. The fuel may then flow from the barrel assemblies 310 (e.g., past the outlet check valves 352 and through the outlet passages 350 in the barrel assemblies 310) to the discharge passage 240 in the manifold 200 and then to the discharge line 40. As a result, fuel (including relatively colder fuel from the storage tank 14 via the inlet line 30 and the reservoir 124) may flow through the inlet passages 342 via the inlet check valves 344 and through the outlet passages 350 via the outlet check valves 352 in the barrel assemblies 310 to assist in cooling the inside of the barrel assemblies 310.

Further, because relatively colder fuel from the storage tank 14 is entering the reservoir 124 via the inlet line 30, the colder fuel may flow around the barrel assemblies 310 to cool the outside of the barrel assemblies 310. Also, the second portions 356 of the outlet passages 350 may be located closer to the outer surfaces of the respective barrel assemblies 310 than the plunger bore 320. As a result, the colder fuel flowing around the barrel assemblies 310 may cool the second portions 356 of the outlet passages 350.

In the discharge line 40, the heater 42 may heat the liquid to gaseous fuel, which may be stored in the accumulator 44. The gaseous fuel may be stored in the accumulator 44, and a valve (not shown) in the discharge line 40 may be closed to prevent the gaseous fuel from being supplied to the engine 12.

When priming begins, the pressure in the outlet passages 350 of the barrel assemblies 310 may be less than the boost pressure of the fuel supplied by the boost pump 16. As fuel flows from the reservoir 124 through the barrel assemblies 310 during priming, the pump 100 may direct fuel to the accumulator 44 until the pressure in the outlet passage 350 and/or the discharge passage 240 in the barrel assemblies 310 is substantially equal to the boost pressure, e.g., the pressure of the fluid in the reservoir 124. The pressures may be substantially equal when enough fuel accumulates downstream of the pump 100 to limit or stop additional fuel from flowing into the outlet passage 350. The fuel may accumulate in lines or passages downstream from the outlet passage 350, such as the discharge passage 240, lines or passages fluidly connecting the pump 100 to the engine 12 (e.g., the discharge line 40 and/or the accumulator 44, if included in the fluid system 10), and/or lines or passages in the engine 12. The range of pressures that are considered "substantially equal" to the boost pressure may include pressures that are slightly less than the boost pressure and that result in stopping fuel flow into the outlet passage 350. When the pressures are substantially equal, the outlet check valves 352 in the barrel assemblies 310 may close, thereby limiting or preventing fuel from flowing into the outlet passages 350.

Excess liquid and/or vapor inside the reservoir 124 may be returned to the storage tank 14 via the bypass passage 260 in the manifold 200 and the bypass line 60, e.g., to maintain a desired pressure within the reservoir 124, as shown in FIG. 6. In this way, regardless of the usage rate of the fluid from the reservoir 124 and/or the supply rate of fluid to the reservoir 124, the reservoir 124 may not be overfilled with fluid and the resulting pressure may be maintained at a desired level. The regulating valve 62 (or orifice) in the bypass line 60 may control the amount of flow directed to the storage tank 14 from the reservoir 124. For example, the regulating valve 62 may maintain a certain difference in pressure between the storage tank 14 and the reservoir 124. Therefore, the regulating valve 62 may adjust the pressure in the bypass line 60 based on the pressure of the fuel in the storage tank 14. The fuel may flow into the reservoir 124 via the inlet line 30 and out of the reservoir 124 via bypass line 60. As a result, fuel (including relatively colder fuel from the storage tank 14 via the inlet line 30 and the reservoir 124) may flow around the barrel assemblies 310 and cool the outside of the barrel assemblies 310.

Thus, when priming the pump 100, a first flow of fuel may be directed from the reservoir 124 into the discharge passage 240 of the pump 100 (e.g., via the inlet passages 342 and the outlet passages 350 in the barrel assemblies 310) without pumping the first flow of fuel until the pressure in the outlet passage 350 and/or the discharge passage 240 is substantially equal to the boost pressure. Also, when priming the pump 100, a second flow of fuel may be directed from the reservoir 124 into the bypass passage 260 and then returned to the storage tank 14.

During priming, some of the fuel that flows from the reservoir 124 into the barrel assemblies 310 may leak past the plungers 330 in the plunger bores 320. The leaked fuel may flow through the plunger bores 320 into the push rod guide bores 206 and the leakage passage 250 in the manifold 200, and the leakage line 50 back to the storage tank 14. As a result, the flow of fuel past the plungers 330 in the plunger bores 320 (including relatively colder fuel from the storage tank 14 via the inlet line 30 and the reservoir 124) may assist in cooling the inside of the barrel assemblies 310.

After fuel stops flowing into the discharge passage 240 of the pump 100, fuel may continue to flow into the reservoir 124 via the inlet line 30 and out of the reservoir 124 via bypass line 60 for a period of time, e.g., until the temperature of the fuel in the bypass line 60, as measured by the sensor 64, drops to a desired temperature, e.g., equal to or less than a threshold temperature. For example, the threshold may be approximately equal to or within an acceptable difference (e.g., 10° C. or less) from the temperature of the fuel in the storage tank 14. For example, if LNG is stored in the storage tank 14 at about −140° C., the desired temperature may be about −130° C. or less, When the desired temperature is reached, priming of the pump 100 may end and normal operation of the pump 100 may begin, For example, during normal operation of the pump 100, a pump controller (not shown) may start the power source (e.g., the electric motor), which may start up the drive mechanism (e.g., the driveshaft 104 and the load plate 112) configured to cause the plungers 330 to cyclically rise and fall within the barrel assemblies 310, and then the pump 100 may pressurize fuel for directing to the engine 12. The valve (not shown) in the discharge line 40 may be opened to allow the gaseous fuel to be injected into the engine 12.

In an embodiment, flow may be directed from the reservoir 124 to the storage tank 14 continuously via the regulating valve 62 (or orifice) in the bypass line 60 during priming and normal operation of the pump 100, Alternatively, the regulating valve 62 may be closed when priming ends (e.g., when the desired temperature is reached) and may remain closed during normal operation of the pump 100.

During normal operation of the pump 100, the driveshaft 104 may be rotated by the power source (e.g., the electric motor), which may cause the load plate 112 to undulate in an axial direction, This undulation may result in translational movement of the push rods 114. As described above, the rotation of the driveshaft 104 in combination with the supply of fuel at boost pressure into the pumping mechanisms 300 may cause axial movement of the plungers 330 between TDC and BDC. Alternatively, other drive mechanisms may be provided, in place of the driveshaft 104 and the load plate 112, to cause the push rods 114 to move translationally.

As the plungers 330 cyclically rise and fall within the barrel assemblies 310, this reciprocating motion may function to allow liquid to flow from the reservoir 124 (e.g., through the inlet passages 342 and past the inlet check valves 344 in the barrel assemblies 310) into the barrel assemblies 310 and to push the fluid from the barrel assemblies 310 (e.g., past the outlet check valves 352 and through the outlet passages 350 in the barrel assemblies 310) at an elevated pressure. The high-pressure liquid may flow through the outlet passages 350 of the barrel assemblies 310, the discharge passage 240 in the manifold 200, and the discharge line 40 to be injected into the engine 12. The pressure of the fluid that is output from the pump 100 via the discharge line 40 may be greater than the pressure of the fluid supplied from the boost pump 16, The manifold 200 may be formed as a single integral component that allows different paths of fluid flow to be routed between the reservoir 124, the storage tank 14, and the accumulator 44 or the engine 12 without individual lines, seals, clamps, or other components for forming the fluid connections during priming and normal operation of the pump 100. The passages in the manifold 200, such as the inlet passage 230, the discharge passage 240, the leakage passage 250, and the bypass passage 260, may be formed using intersecting linear bores that are positioned to avoid having to use plugs to prevent leakage from the passages, as described above. Also, the linear bores of the inlet passage 230, the discharge passage 240, the leakage passage 250, and the bypass passage 260 may be positioned to avoid intersections between the different passages and to provide a design that may be easier to manufacture. Also, fuel flowing through the passages in the manifold 200 may assist in cooling the manifold 200 and therefore the pump 100.

The barrel assemblies 310 may be disposed in the pump 100 to provide a more compact design that may be less susceptible to failure due to thermal stresses. For example, flow may be discharged from the barrel assemblies 310 via the respective outlet passages 350, which may be disposed in the barrel assemblies 310 parallel to the plunger bores 320, instead of as individual lines or pipes that are external and connected to the barrel assemblies 310. External pipes may have minimum bend radii requirements, which may cause the external pipes to take up more space. External pipes may also experience pressure waves, which may cause the pipes to vibrate and leak, Without external pipes, the barrel assemblies 310 may be formed with a lower overall number of connections and shorter routes for the fuel, and may provide a uniform and symmetric geometry that reduces thermal gradients. Also, the design of the barrel assemblies 310 may be relatively compact and may allow for a relatively smaller radial distance R for the barrel assemblies 310. As a result, the overall size of the pump 100 may be smaller.

In addition, without external pipes, less surface area may be exposed to the fuel in the reservoir 124, which may reduce heat transfer from the outlet passages 350 in the barrel assemblies 310 to the fuel in the reservoir 124. The outlet passages 350 may receive fuel that may be relatively warmer during normal operation of the pump 100 than the fuel in the reservoir 124.

The plungers 330 may be sealless, and at least the main portions 332 of the plungers 330 may have a uniform outer dimension (e.g., the outer diameter). The plungers 330 may also be formed as a single integral component, and a tight clearance may be formed between the plungers 330 and the respective plunger bores 320. The plungers 330 may be formed without an external seal (e.g., a piston seal, such as a plastic or non-metallic component disposed on the outer surface of the plunger 330), which may wear and limit the life of the pump 100. Alternatively, the plungers 330 may include the external seal or other type of seal. The plungers 330 may be connected to or disconnected from the distal ends 116 of the push rods 114. When the plungers 330 are not connected to the push rods 114, any side forces on the plungers 330 from the push rods 114 may be reduced or eliminated. This may reduce or eliminate wear, scuffing, and other damage on the plungers 330 and the plunger bores 320.

It will be apparent to those skilled in the art that various modifications and variations can be made to the pump of the present disclosure. Other embodiments of the fluid system and the pump will be apparent to those skilled in the art from consideration of the specification and practice of the fluid system and the pump disclosed herein. It is intended that the specification and examples be considered as exemplary only, with a true scope being indicated by the following claims and their equivalents.

What is claimed is:

1. A manifold for a pump, the manifold being configured to connect to a jacket to form a reservoir and to connect to at least one pumping mechanism disposed within the reservoir, the manifold comprising:
    a first side including a first side surface configured to face the reservoir;
    a second side opposite the first side, the second side including a second side surface;
    a plurality of push rod guide bores extending through the first side surface and the second side surface;
    a leakage passage including a plurality of connecting branches fluidly connecting each of the plurality of push rod guide bores to an outlet branch including an outlet disposed outside the first side surface;
    a bypass passage including an inlet disposed in the first side surface, the bypass passage further including an outlet disposed outside the first side surface; and
    a discharge passage including at least one inlet disposed in the first side surface, the at least one inlet of the discharge passage configured to fluidly connect to the at least one pumping mechanism to receive fluid pumped by the at least one pumping mechanism, the discharge passage further including an outlet disposed outside the first side surface,
    wherein the connecting branches of the leakage passage and the push rod guide bores form a loop, and
    wherein each connecting branch of the leakage passage extends between a respective pair of the push rod guide bores, each connecting branch including two linear portions, each of the linear portions having a first end and a second end, the first ends of the two linear portions intersecting a respective one of the pair of the push rod guide bores, the second ends of the two linear portions connecting to each other to form an apex.

2. The manifold of claim 1, wherein the second side includes a base, the base forming the second side surface; and the first side includes a raised portion extending from the base, the raised portion forming the first side surface facing away from the base and being configured to be inserted into the jacket.

3. The manifold of claim 2, further including:
    an inlet passage including an inlet disposed outside the first side surface, the inlet passage further including an outlet disposed in the first side surface;
    wherein the outlet of the inlet passage is disposed adjacent a center of the raised portion.

4. The manifold of claim 3, wherein:
    the at least one inlet of the discharge passage includes a plurality of inlets of the discharge passage disposed farther from the center of the raised portion than the outlet of the inlet passage, and the at least one pumping mechanism includes a plurality of pumping mechanisms, each of the plurality of the inlets of the discharge passage corresponding to one of the plurality of the pumping mechanisms; and
    the discharge passage further includes a plurality of connecting branches and an outlet branch, the outlet branch of the discharge passage including the outlet, the connecting branches of the discharge passage fluidly connecting each inlet of the discharge passage in parallel to the outlet branch of the discharge passage.

5. The manifold of claim 4, wherein each connecting branch of the discharge passage is generally perpendicular to the outlet branch of the discharge passage when viewed from at least one of the first side or the second side.

6. The manifold of claim 3, wherein the raised portion includes a recess near the center of the raised portion, the outlet of the inlet passage being disposed in the recess.

7. The manifold of claim 2, further including:
    a peripheral surface extending between the first and second sides;
    wherein the base includes a flange forming the peripheral surface, the flange including at least one mounting bore extending through the flange and configured to receive at least one fastener.

8. The manifold of claim 7, wherein:
the at least one mounting bore includes a plurality of mounting bores disposed around a periphery of the flange;
the outlet of the leakage passage, the outlet of the bypass passage, and the outlet of the discharge passage are disposed on the peripheral surface; and
the leakage passage, the bypass passage, and the discharge passage are disposed between different pairs of the plurality of mounting bores.

9. The manifold of claim 1, wherein the plurality of the push rod guide bores and the connecting branches of the leakage passage are disposed around the at least one inlet of the discharge passage.

10. The manifold of claim 1, wherein the inlet of the bypass passage is disposed outside the loop.

11. A manifold for a pump, the manifold being configured to connect to a jacket to form a reservoir and to connect to at least one pumping mechanism disposed within the reservoir, the manifold comprising:
a first side including a first side surface configured to face the reservoir;
a second side opposite the first side, the second side including a second side surface;
an inlet passage including an inlet disposed outside the first side surface, the inlet passage further including an outlet disposed in the first side surface;
a plurality of push rod guide bores each extending through the first side surface and the second side surface;
a leakage passage including a plurality of connecting branches fluidly connecting the plurality of push rod guide bores, at least one of the connecting branches being fluidly connected to an outlet branch having an outlet disposed outside the first side surface;
a bypass passage including an inlet disposed in the first side surface, the bypass passage further including an outlet disposed outside the first side surface; and
a discharge passage including a plurality of inlets disposed in the first side surface, the plurality of inlets of the discharge passage being configured to fluidly connect to the plurality of pumping mechanisms to receive fluid pumped by the plurality of pumping mechanisms, and the plurality of inlets being connected in parallel to an outlet branch, the outlet branch of the discharge passage having an outlet disposed outside the first side surface,
wherein the connecting branches of the leakage passage and the push rod guide bores form a loop, and
wherein each connecting branch of the leakage passage extends between a respective pair of the push rod guide bores, each connecting branch including two linear portions, each of the linear portions having a first end and a second end, the first ends of the two linear portions intersecting a respective one of the pair of the push rod guide bores, the second ends of the two linear portions connecting to each other to form an apex.

12. The manifold of claim 11, wherein the discharge passage further includes a plurality of connecting branches fluidly connecting each inlet of the discharge passage in parallel to the outlet branch of the discharge passage.

13. The manifold of claim 11, wherein the outlet branch of the leakage passage fluidly connects to at least one of the connecting branches of the leakage passage in the loop.

14. A pump comprising:
a reservoir configured to receive a fluid from a storage tank;
a plurality of pumping mechanisms configured to receive a first portion of the fluid from the reservoir and discharge pumped fluid through at least one outlet passage; and
a manifold configured to direct fluid between the reservoir, the storage tank, and the at least one pumping mechanism, the manifold including:
a first side surface configured to face the reservoir and connect to the at least one pumping mechanism,
a second side opposite the first side, the second side including a second side surface;
a plurality of push rod guide bores extending through the first side surface and the second side surface;
an inlet passage including an inlet configured to receive the fluid from the storage tank, the inlet passage further including an outlet in the first side surface configured to direct the fluid into the reservoir,
a leakage passage including at least one inlet configured to receive fluid leaked from the plurality of pumping mechanisms, a plurality of connecting branches, and an outlet configured to output the fluid leaked from the plurality of pumping mechanisms, wherein the plurality of connecting branches fluidly connect each of the plurality of push rod guide bores to the outlet,
a bypass passage including an inlet in the first side surface, the inlet of the bypass passage being configured to receive a second portion of the fluid from the reservoir, the bypass passage further including an outlet configured to output the second portion of the fluid from the reservoir, and
a discharge passage including at least one inlet fluidly connected to the at least one outlet passage of the plurality of pumping mechanism, the discharge passage further including an outlet configured to output the pumped fluid from the at least one outlet passage,
wherein the connecting branches of the leakage passage and the push rod guide bores form a loop, and
wherein each connecting branch of the leakage passage extends between a respective pair of the push rod guide bores, each connecting branch including two linear portions, each of the linear portions having a first end and a second end, the first ends of the two linear portions intersecting a respective one of the pair of the push rod guide bores, the second ends of the two linear portions connecting to each other to form an apex.

15. The pump of claim 14, wherein:
the pump further includes a plurality of push rods, each push rod configured to move within one of the plurality of push rod guide bores to push a respective plunger of each of the plurality of pumping mechanisms.

16. The pump of claim 14, further including a jacket that connects to the manifold to form the reservoir.

17. The pump of claim 14, wherein the at least one inlet of the discharge passage includes a plurality of the inlets fluidly connected to a plurality of the outlet passages of the pumping mechanisms.

18. The pump of claim 16, wherein the second side includes a base, the base forming the second side surface; and the first side includes a raised portion extending from the base, the raised portion forming the first side surface facing away from the base and being configured to be inserted into the jacket.

19. The pump of claim 18, further including:
a peripheral surface extending between the first and second sides;

wherein the base includes a flange forming the peripheral surface, the flange including a plurality of mounting bores extending through the flange, each of the plurality of mounting bores configured to receive a fastener.

* * * * *